Patented Jan. 30, 1940

2,188,663

UNITED STATES PATENT OFFICE 2,188,663

PROCESS OF MAKING FINE PARTICLE ALKALINE EARTH METAL CARBONATES

Raymond R. McClure and John Pierre Seguin, Painesville, Ohio, assignors to Diamond Alkali Company, Pittsburgh, Pa., a corporation of Delaware Application April 4, 1938, Serial No. 199,910

10 Claims. (Cl. 23—66)

This invention relates generally to the production of fine particle alkaline earth metal carbonates by treating a suspension of alkaline earth metal hydroxide with carbon dioxide gas to form fine particle alkaline earth metal carbonates. The invention is applicable to the production of fine particle carbonates of calcium, barium and strontium but will be described in detail in connection with the production of calcium carbonate. The invention consists essentially in the addition to the suspension of calcium hydroxide in water of one or more addition agents, which enable the production of fine particle size calcium carbonate of substantially colloidal character over a wider range of temperatures, concentrations of calcium hydroxide and without the rigid control of other factors which it has been necessary to take into consideration in carrying out processes according to the prior art. The addition agents which we employ for aiding the precipitation of our fine particle size calcium carbonate are the monosaccharides, disaccharides and polyhydroxy alcohols containing 4, 5 or 6 hydroxyl groups.

In the accompanying drawings, which illustrate certain embodiments of our invention and also an embodiment according to the prior art, the figures are charts showing the results obtained by settling or sedimentation tests to determine the relative particle size of the calcium carbonate precipitated from calcium hydroxide solutions under various conditions.

Figure 1:
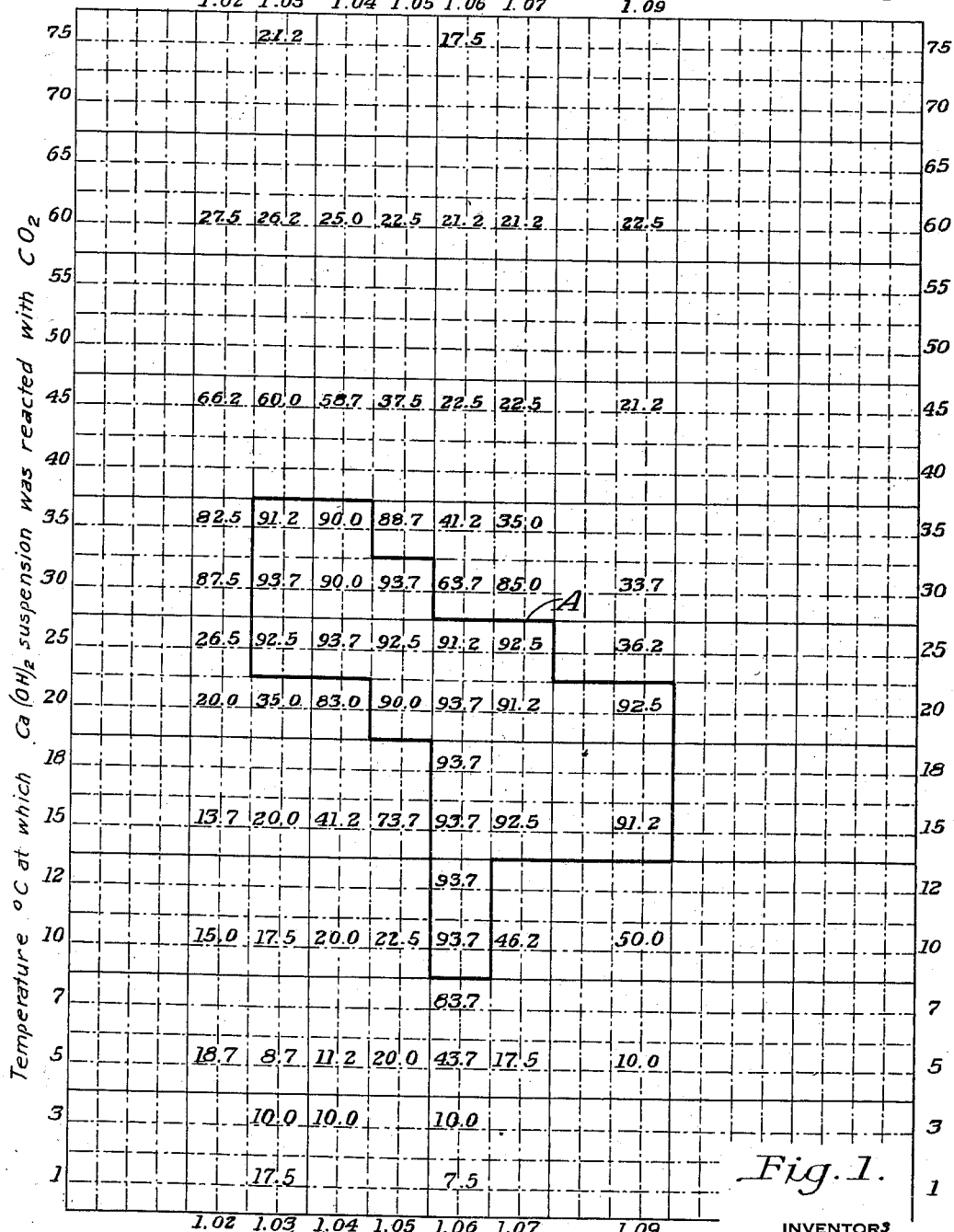

Figure 1 represents the results of tests on calcium carbonate made in accordance with the prior art, and Figures 2 through 5 represent the results of tests made according to the present invention by employing certain addition agents in the suspension of calcium hydroxide which was treated with carbon dioxide gas.

The process of precipitating calcium carbonate from calcium hydroxide water suspension by treating the suspension with carbon dioxide gas is well known. In this process, it is known that factors which govern the size of the particles of the resulting calcium carbonate are:

(1) The purity of the lime used in making the calcium hydroxide water suspension.

(2) The method used for slaking the lime to make the calcium hydroxide water suspension.

(3) The rate of addition of the carbon dioxide gas to the calcium hydroxide water suspension.

(4) The degree of agitation during the reaction between the carbon dioxide gas and the calcium hydroxide.

(5) The concentration of the calcium hydroxide in water suspension—that is, the specific gravity of the calcium hydroxide slurry.

(6) The temperature at which the reaction between the carbon dioxide and the calcium hydroxide suspension is carried out, also the control exercised to prevent undue rise in the temperature during the reaction.

The two last mentioned factors are of major importance. By proper control of all of the above mentioned factors, particularly concentration of the calcium hydroxide suspension and the temperature of reaction, it is known that the particle size of the calcium carbonate can be made to vary from a substantially colloidal character to a relatively coarse particle size similar to a finely pulverized limestone whiting.

In one method of making fine particle size calcium carbonate in accordance with the prior art, the reaction temperature of the calcium hydroxide slurry, when treated with carbon dioxide, was maintained at a temperature between 10 and 25° C. by employing refrigeration. At temperatures below 10° C., the particle size increased quite rapidly with decreased temperature. At temperatures above 25° C., the particle size increased with increased temperatures, being no longer of substantially colloidal character. Thus there is a very narrow temperature range in which the reaction can be carried out, and it is necessary to employ cooling apparatus, in order to obtain this rigid temperature control. If cooling coils are employed for this purpose, they tend to become coated with calcium carbonate scale, which acts as a heat insulator, thereby rendering the cooling of the solution more difficult. In practical operation of this prior art process, it is necessary to employ a calcium hydroxide suspension having a specific gravity of approximately 1.06. In more dilute slurries, the amount of water to handle is excessive and in more concentrated slurries, it is difficult to maintain the necessary rigid temperature control of between 10 and 25° C., because of the large amount of heat given off in the reaction.

By the addition of certain agents to the calcium hydroxide suspension, in accordance with the present invention, and as hereinafter more particularly described, the temperature range at which the reaction with carbon dioxide is carried out is greatly widened, so as to avoid the need for refrigeration, and indeed to avoid the need for rigid temparture control, and yet produce calcium carbonate of substantially colloidal character. The addition agents are inexpensive, may be readily removed by washing or if left in the finished material in small quantities are of a character such as not to detract from the usefulness of the product. Furthermore, the addition agents are recoverable for use in another operating cycle.

The addition agents which may be used in the water suspension of calcium hydroxide or other alkaline earth metal hydroxide are the monosaccharides, disaccharides, or the polyhydroxy alcohols containing 4, 5 or 6 hydroxyl groups. Among the monosaccharides ($C_6H_{12}O_6$) are glucose, fructose, galactose and mannose. Among the disaccharides ($C_{12}H_{22}O_{11}$) are sucrose, lactose and maltose. Both the monosaccharides and the disaccharides fall in the general class of sugars. For economic reasons and because of its availability, it is preferred to use sucrose as the addition agent.

Among the polyhydroxy alcohols which may be used as addition agents and which contain 4, 5 or 6 hydroxyl groups may be mentioned erythritol $C_4H_6(OH)_4$, arabitol, xylitol and adonitol, each of the formula $C_5H_7(OH)_5$, and mannitol, dulcitol and sorbitol, each of the formula $C_6H_8(OH)_6$.

To illustrate the value of our invention, a large number of samples of calcium carbonate were prepared by the known process, that is, by treating suspensions of calcium hydroxide in water with carbon dioxide gas, and the relative particle size was determined. We then prepared a large number of samples of calcium carbonate by treating with carbon dioxide gas suspensions of calcium hydroxide in water, which suspensions also contained various quantities of addition agents of the type previously referred to and the relative particle size of the resulting calcium carbonate was determined. In all tests, a high purity calcium oxide was slaked in pure water under closely controlled similar conditions. The same source of carbon dioxide gas was used in all samples and the rate of addition of carbon dioxide and degree of agitation of the calcium hydroxide suspension were uniformly controlled in the preparation of all samples. Tests were carried out using calcium hydroxide suspensions of different specific gravities. The temperatures of reaction of the calcium hydroxide slurry and carbon dioxide gas were varied over wide ranges and the amounts of addition agents were also varied. Temperature control was maintained throughout the entire precipitation process to plus or minus five tenths of one degree centigrade.

The relative particle size of the resulting calcium carbonate was determined by settling tests carried out in the following manner:—A water suspension of 25 grams of each dried sample of calcium carbonate or other alkaline earth metal carbonate in five hundred cubic centimeters of distilled water was made by dispersing the sample until the mixture was completely homogeneous. This suspension contained 4.75% calcium carbonate by weight. The conditions of dispersion in regard to time, temperature and other details of procedure were identical for all samples. Equal volumes of the dispersed samples were placed in clean glass tubes of uniform dimensions, sealed and set aside for 48 hours. At the end of this period, measurements were made to determine the height of the column to which the dispersed calcium carbonate had settled. It will be understood that after the settling period there was a layer of clear supernatant liquid on top and a layer below it containing the settled calcium carbonate. The original height of the suspension was taken as 100% and the height of the settled out solids was recorded as per cent of the total height of solids plus clear supernatant water. These percentages are those recorded on the charts of Figures 1 through 5. The calcium carbonates of finer particle size, when completely dispersed in distilled water, were, due to the large amount of exposed surfaces, found to settle out only very slightly, whereas the calcium carbonates of larger particle size were, due to the relatively small area of exposed surface, found to settle out almost completely. In the charts, therefore, the higher per cents represent the finer particle sizes, and the lower per cents the larger particle sizes.

Referring more particularly now to Figure 1, this chart represents the results of tests made by treating calcium hydroxide in water suspensions with carbon dioxide gas, the suspensions not containing any addition agents. Tests were carried out with suspensions having specific gravities of 1.02, 1.03, 1.04, 1.05, 1.06, 1.07 and 1.09. At each concentration of calcium hydroxide, samples were reacted with carbon dioxide, the temperatures of the slurry ranging from 1° C. to 75° C., each temperature being controlled in each case to plus or minus .5° C. In Figure 1, the specific gravities are plotted as abscissas and the temperatures at which the calcium hydroxide suspension was reacted with carbon dioxide gas are plotted as the ordinates.

A portion of the graph is enclosed by the line A, the area within the line including only samples in which the size of the calcium carbonate particles was such that the height of the settled solids, as determined by the settling tests, exceeds 90%. These per cents, as previously indicated, are used to represent the relative fineness of the calcium carbonate particles and will be referred to hereinafter as the "settling factor". It will be noted that only a relatively small area is included within the line A, showing that only within very restricted conditions of temperatures of reaction and specific gravities can the very fine particle size calcium carbonate be obtained. It is to be understood, of course, that the present invention is not limited to the production of particles of a size such that the settling factor is 90 or greater, but this factor has been taken for comparative purposes to show the wider variations in temperature of reaction and concentration of calcium hydroxide in water suspensions, which may be employed in accordance with the present invention, as hereinafter pointed out.

These data show that at a specific gravity of 1.02, particles having a settling factor of 90 or greater can not be obtained at any of the reaction temperatures. The ranges of reaction temperatures at which particles having a settling factor of 90 or greater may be made are indicated in the following Table I for the different specific gravities of suspension of calcium hydroxide in water:

TABLE I.—$Ca(OH)_2$—Water suspension

| Specific gravity | Temperature ° C. |
|---|---|
| 1.02 | |
| 1.03 | 25 to 35 |
| 1.04 | 25 to 35 |
| 1.05 | 20 to 30 |
| 1.06 | 10 to 25 |
| 1.07 | 15 to 25 |
| 1.09 | 15 to 20 |

In no case does the reaction temperature range exceed 15° C. and for most specific gravities, the range of temperature is 10° C. or less. Furthermore, the temperatures which must be employed are all relatively low, so that refrigeration must be employed. These data show that both the concentration of the calcium hydroxide suspension and the temperature of the reaction must be closely controlled to produce calcium carbonate of the smallest particle size. Since the reaction of forming calcium hydroxide water suspensions from calcium oxide and water evolves large quantities of heat, the milk of lime required for the above process requires extensive cooling or refrigeration before the conversion to calcium carbonate can be started. Also the reaction converting the calcium hydroxide to calcium carbonate with carbon dioxide gas, generates large quantities of heat, which again requires extensive cooling to maintain the necessary rigid control of temperature.

Figure 2:
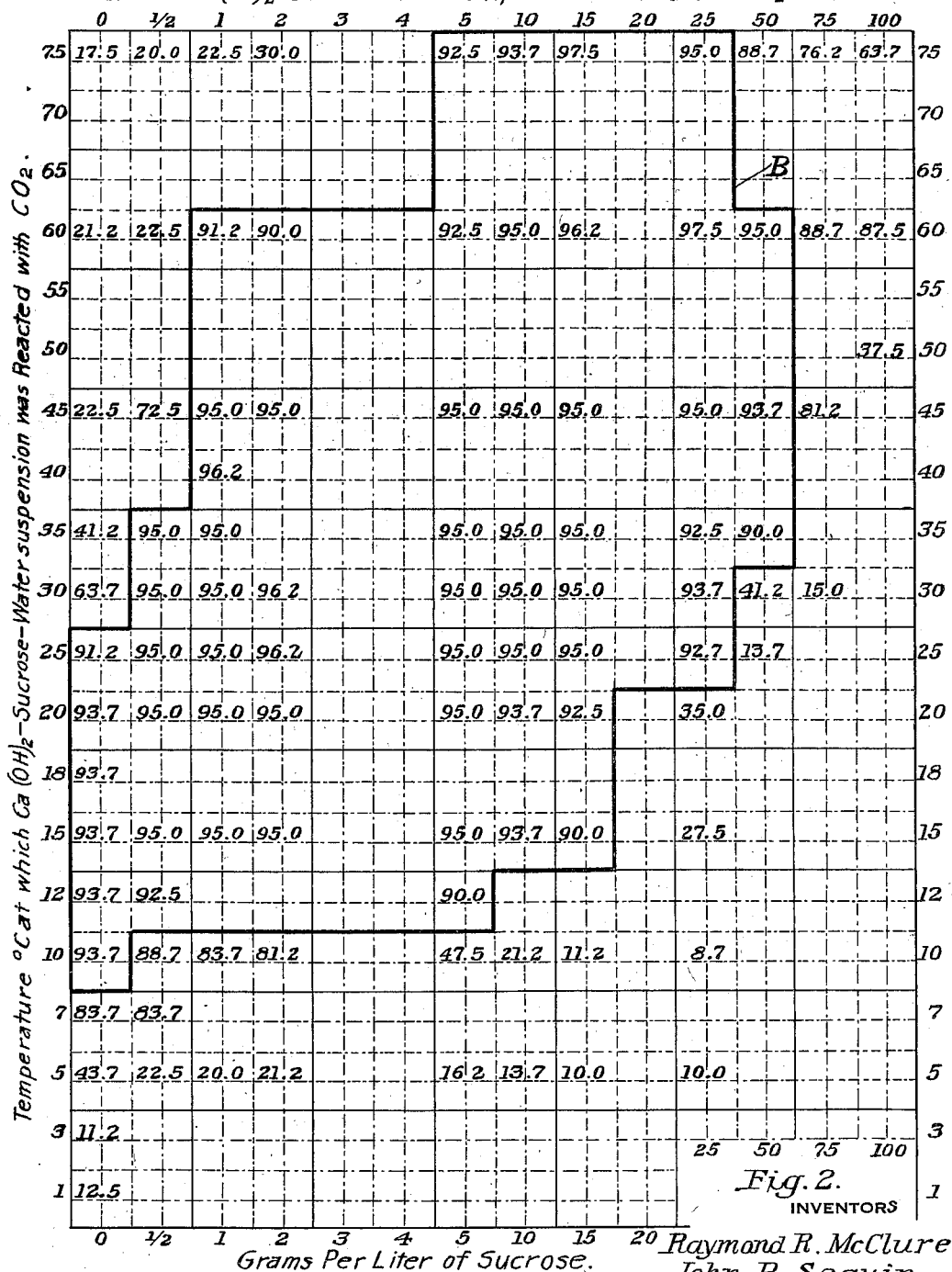

Referring now to Figure 2, the graph is similar to that shown in Fig. 1, except that there were added to the suspensions of calcium hydroxide in water the indicated quantities of sucrose. The specific gravity of the calcium hydroxide-sucrose-water suspension before treatment with the carbon dioxide gas was 1.06. The conditions of precipitation of the calcium carbonate by carbon dioxide and the method employed in determining the settling factors were the same as those employed in the tests represented in Figure 1.

Before making the settling tests, the precipitated samples of calcium carbonate were filtered, washed substantially free from sucrose and dried.

Those samples having a settling factor of 90 or greater are located within the area bounded by the line B. It will be noted that the area within the line B is many times larger than the area bounded by the line A. From these data, it is shown that the range of reaction temperature at which very fine particle size calcium carbonate can be precipitated is very much extended beyond the range of reaction temperatures which may be employed with calcium hydroxide in water suspensions but not containing addition agents. The following Table II gives the reaction temperature ranges which may be employed to produce calcium carbonate having a particle size such that the settling factor is 90 or greater, when various amounts of sucrose ranging from ½ gram per liter to 100 grams per liter of the suspension are employed.

TABLE II.—*1.06 S. G. Ca(OH)$_2$—Sucrose-water suspension*

| Temperature ° C. | Grams per liter sucrose |
|---|---|
| 10 to 25 | 0 |
| 12 to 35 | ½ |
| 12 to 60 | 1 |
| 12 to 60 | 2 |
| 12 to 75 | 5 |
| 15 to 75 | 10 |
| 15 to 75 | 15 |
| 25 to 75 | 25 |
| 35 to 60 | 50 |

Figure 3:
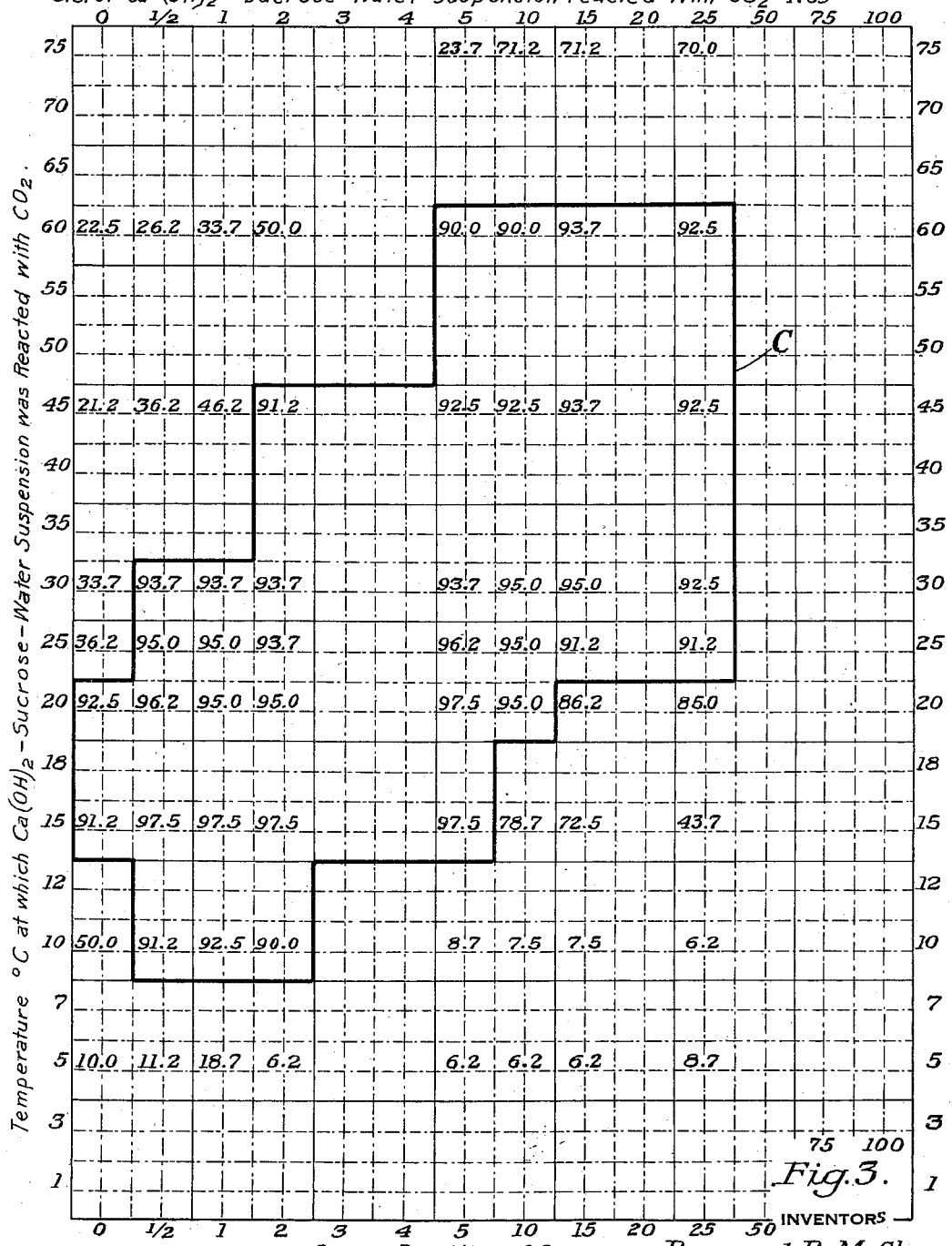

Figure 3 is a chart similar to Figure 2, except that the specific gravity of the calcium hydroxide-sucrose-water suspension was 1.09. Here again the area bounded by the line C is many times greater than the area bounded by the line A. Also the reaction temperature range is increased greatly over that which may be employed without the use of an addition agent and still produce calcium carbonate of the same settling factor. The corresponding Table III shows the range of reaction temperatures for the corresponding amounts of sucrose which may be employed in producing calcium carbonate having a settling factor of 90 or more.

TABLE III.—*1.09 S. G. Ca(OH)$_2$—Sucrose-water suspension*

| Temperature ° C. | Grams per liter sucrose |
|---|---|
| 15 to 20 | 0 |
| 10 to 30 | ½ |
| 10 to 30 | 1 |
| 10 to 45 | 2 |
| 15 to 60 | 5 |
| 20 to 60 | 10 |
| 25 to 60 | 15 |
| 25 to 60 | 25 |

Figure 4:
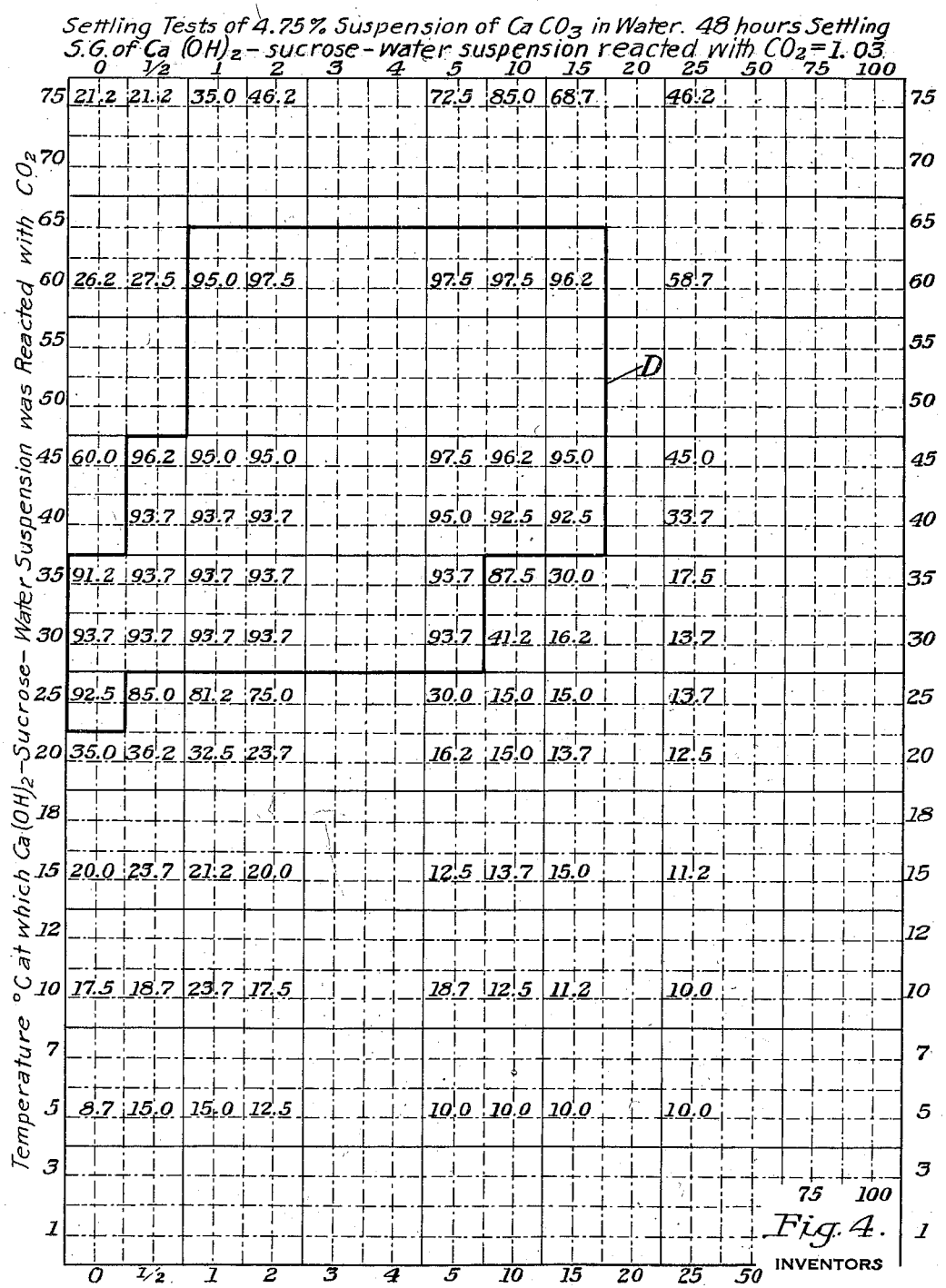

Figure 4 is similar to Figures 2 and 3, except that the specific gravity of the calcium hydroxide-sucrose-water suspension was 1.03. Here again the temperature ranges which may be employed are considerably greater than those which may be employed as represented in Figure 1. In Figure 4, the line D designates the area including settling factors of 90 or greater and the corresponding data are shown in Table IV.

TABLE IV.—*1.03 S. G. Ca(OH)$_2$—Sucrose-water suspension*

| Temperature ° C. | Grams per liter sucrose |
|---|---|
| 25 to 35 | 0 |
| 30 to 45 | ½ |
| 30 to 60 | 1 |
| 30 to 60 | 2 |
| 30 to 60 | 5 |
| 40 to 60 | 10 |
| 40 to 60 | 15 |

Figure 5:
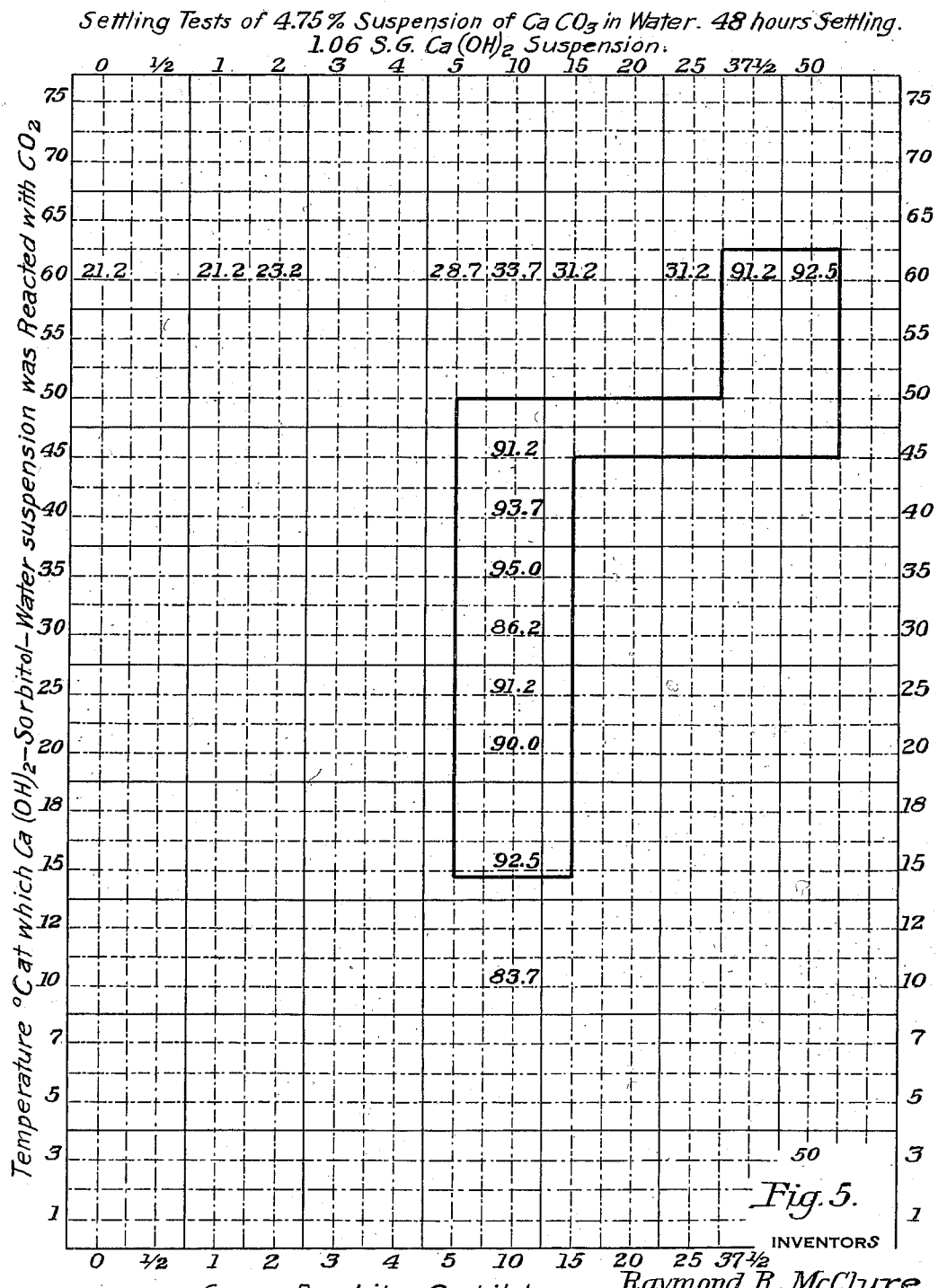

Figure 5 represents the results obtained using sorbitol as the addition agent, the specific gravity of the calcium hydroxide-sorbitol-water suspension being 1.06. This graph shows that calcium carbonate having a settling factor of 90 or greater may be obtained within the ranges of about 15 to 65° C.

The several figures show that precipitated calcium carbonate having a fineness corresponding to a settling factor of 90 or greater may be obtained within a wider variation of concentration of the calcium hydroxide in water suspension, at greater temperature range variation than can be used where an addition agent is not employed, and that where an addition agent such as those described is used the naturally occurring reaction temperatures resulting from slaking lime and carbonating the slurry may be employed without resorting to the use of refrigeration.

Although the invention is not restricted to the production of particle sizes represented by a settling factor of 90 or greater, samples showing a settling factor of 90 or greater have been found to possess excellent reinforcing properties in rubber, paint and other plastics. Samples showing a settling factor of 75, although of somewhat less value than those having a settling factor of 90 or greater, still have reinforcing value when used as a reinforcing pigment for rubber far beyond ordinary whiting, such as a finely ground commercial natural whiting. For comparative purposes, a sample of finely ground commercial natural whiting was found to have a settling factor of 10. A sample of precipitated chalk of superlight commercial grade had a settling factor of 37.5. Our invention is useful in producing any of these size particles but is particularly useful in the production of particle sizes represented by a settling factor of 90 or more.

In order to produce the optimum results with regard to particle size, it is advisable to vary the quantity of addition agent in accordance with the concentration of the calcium hydroxide slurry. However, we have found that the addition of sucrose, for example, to a calcium hydroxide in water suspension increases the reaction temperature range which may be employed in producing calcium carbonate of a given fineness and this is true irrespective of the purity of the calcium oxide used, the method of slaking it, the concentration of the calcium hydroxide in water suspension, the concentration of the carbon dioxide gas, the rate of addition of the carbon dioxide gas to the suspension or the degree of agitation of the suspension.

The specific gravity of the suspension to be treated with carbon dioxide may be any value from slightly over one up to, say 1.15 or 1.20, depending upon the efficiency of the stirring apparatus. The specific gravity is limited only by the efficiency of the stirring apparatus, since any specific gravity may be employed, provided that the stirrer will agitate the slurry sufficiently, when treated with carbon dioxide gas. The difficulties of efficient agitation increase materially when the specific gravity exceeds about 1.09, due to the fact that the gel which forms upon the addition of carbon dioxide becomes rather difficult to work. It is, therefore, preferred to employ specific gravities not exceeding 1.09, the preferred specific gravity being about 1.06.

The amount of sucrose or other addition agent may vary between ½ gram and 100 grams per liter of the calcium hydroxide in water suspension, but the quantity depends upon the fineness of the particles to be produced, the temperatures employed and the concentration of the suspension treated with carbon dioxide. Generally the addition agent amounts to between 1 and 50 grams per liter of the suspension and preferably between 1 and 30 grams per liter. By reference to Figure 2, it is seen that 5 grams per liter of sucrose enables the use of any temperature between 12 and 75° C. for the production of calcium carbonate having a settling factor of 90 or over.

The temperatures of reaction which may be employed may vary between about 5 and 80° C. and are generally between 10 and 75° C.

Although the invention has been described particularly in connection with the production of calcium carbonate from calcium hydroxide suspensions, it is to be understood that the other alkaline earth metals, such as barium and strontium, may be used in place of calcium for the production of the corresponding carbonates. The invention is not limited to the preferred reaction temperatures, concentrations of suspension or quantities of addition agents but may be otherwise embodied within the scope of the following claims.

We claim:

1. A process of precipitating alkaline earth metal carbonate of fine particle size, which comprises treating with carbon dioxide a water suspension of alkaline earth metal hydroxide containing a crystalline, completely water-soluble material of the class consisting of monosaccharides, disaccharides and polyhydroxy alcohols containing 4, 5 or 6 hydroxyl groups which do not react with the alkaline earth metal to form an insoluble precipitate.

2. A process of precipitating calcium carbonate of fine particle size, which comprises treating with carbon dioxide a water suspension of calcium hydroxide containing a crystalline, completely water-soluble material of the class consisting of monosaccharides, disaccharides and polyhydroxy alcohols containing 4, 5 or 6 hydroxyl groups which do not react with the calcium to form in insoluble precipitate.

3. A process of precipitating calcium carbonate of fine particle size, which comprises treating with carbon dioxide a water suspension of calcium hydroxide containing a crystalline, completely water-soluble material of the class consisting of polyhydroxy alcohols containing 4, 5 or 6 hydroxyl groups which do not react with the calcium to form an insoluble precipitate.

4. A process of precipitating calcium carbonate of fine particle size, which comprises treating with carbon dioxide a water suspension of calcium hydroxide of specific gravity between slightly over 1 and 1.20, and containing a crystalline, completely water-soluble material of the class consisting of monosaccharides, disaccharides, and polyhydroxy alcohols containing 4, 5 or 6 hydroxyl groups which do not react with the calcium to form an insoluble precipitate.

5. A process of precipitating calcium carbonate of fine particle size, which comprises treating with carbon dioxide a water suspension of calcium hydroxide at a temperature between about 5° C. and 80° C., the suspension of calcium hydroxide having a specific gravity between slightly over one and 1.20 and containing from ½ gram to 100 grams of a crystalline, completely water-soluble material of the class consisting of monosaccharides, disaccharides and polyhydroxy alcohols containing 4, 5 or 6 hydroxyl groups which do not react with the calcium to form an insoluble precipitate.

6. A process of precipitating calcium carbonate of fine particle size, which comprises treating with carbon dioxide a water suspension of calcium hydroxide at a temperature between about 10° C. and 75° C., the suspension of calcium hydroxide having a specific gravity between slightly over one and 1.20 and containing from 1 gram to 50 grams of a crystalline, completely water-soluble material of the class consisting of monosaccharides, disaccharides and polyhydroxy alcohols containing 4, 5 or 6 hydroxyl groups which do not react with the calcium to form an insoluble precipitate.

7. A process of precipitating calcium carbonate of fine particle size, which comprises treating with carbon dioxide a water suspension of calcium hydroxide at a temperature between about 5° C. and 75° C., the suspension of calcium hydroxide having a specific gravity between slightly over 1 and 1.15 and containing from about 1 to 30 grams of a crystalline, completely water-soluble material of the class consisting of monosaccharides, disaccharides or polyhydroxy alcohols containing 4, 5 or 6 hydroxyl groups which do not react with the calcium to form an insoluble precipitate.

8. A process of precipitating calcium carbonate of fine particle size, which comprises treating with carbon dioxide a water suspension of calcium hydroxide at a temperature between about 5° C. and 75° C., the suspension of calcium hydroxide having a specific gravity between slightly over 1 and 1.15 and containing from about ½ gram to 100 grams of a crystalline, completely water-soluble material of the class consisting of polyhydroxy alcohols containing 4, 5 or 6 hydroxyl groups which do not react with the calcium to form an insoluble precipitate.

9. A process of precipitating alkaline earth metal carbonate of fine particle size, which comprises treating with carbon dioxide a water suspension of calcium hydroxide containing a crystalline, completely water soluble monosaccharide which does not react with the alkaline earth metal to form an insoluble precipitate.

10. A process of precipitating alkaline earth metal carbonate of fine particle size, which comprises treating with carbon dioxide a water suspension of calcium hydroxide containing a crystalline, completely water soluble disaccharide which does not react with the alkaline earth metal to form an insoluble precipitate.

RAYMOND R. McCLURE.
JOHN PIERRE SEGUIN.